United States Patent
Schaffnit

(10) Patent No.: US 8,508,069 B2
(45) Date of Patent: Aug. 13, 2013

(54) VEHICULAR ELECTRICAL SYSTEMS

(75) Inventor: Jochen Schaffnit, Darmstadt (DE)

(73) Assignee: GM Global Technology Operations LLC, Detroit, MI (US)

( * ) Notice: Subject to any disclaimer, the term of this patent is extended or adjusted under 35 U.S.C. 154(b) by 414 days.

(21) Appl. No.: 12/791,632

(22) Filed: Jun. 1, 2010

(65) Prior Publication Data

US 2011/0291475 A1    Dec. 1, 2011

(51) Int. Cl.
*H01M 6/50*    (2006.01)
(52) U.S. Cl.
USPC .......................................... 307/10.1
(58) Field of Classification Search
USPC .................... 307/10.1, 9.1; 320/109, 101
See application file for complete search history.

(56) References Cited

U.S. PATENT DOCUMENTS

| | | | |
|---|---|---|---|
| 7,456,602 B2 | 11/2008 | Hampo et al. | |
| 7,960,857 B2 * | 6/2011 | King | 307/10.1 |
| 7,994,751 B2 * | 8/2011 | Noguchi et al. | 320/101 |
| 8,076,883 B2 | 12/2011 | Wallner | |
| 8,084,883 B2 * | 12/2011 | Komazawa et al. | 307/9.1 |
| 8,143,856 B2 * | 3/2012 | Andrea et al. | 320/128 |
| 8,319,477 B2 | 11/2012 | Bergkoetter et al. | |
| 2009/0032135 A1 * | 2/2009 | Iida et al. | 141/5 |

FOREIGN PATENT DOCUMENTS

CN    1475378 A    2/2004

OTHER PUBLICATIONS

German Patent and Trademark Office, Office Action for German Patent Application No. 10 2011 076 042.3, mailed Apr. 4, 2013.
Chinese Patent & Trademark Office, Office Action in Chinese Patent Application No. 201110145925.1, mailed Apr. 24, 2013 (003.0783CN-s).

* cited by examiner

*Primary Examiner* — Daniel Cavallari
(74) *Attorney, Agent, or Firm* — Ingrassia Fisher & Lorenz, P.C.

(57) ABSTRACT

Vehicular electrical systems are provided. The vehicular electrical systems include a first direct current (DC) voltage supply, a second DC voltage supply coupled to the first DC voltage supply, a first direct current-to-direct current (DC/DC) power converter coupled to the first and second DC voltage supplies, a second DC/DC power converter coupled to first and second DC voltage supplies and the first DC/DC power converter, and a power receptacle electrically connected to the second DC/DC power converter. The second DC/DC power converter is configured to regulate power flow between the first and second voltage supplies and the power receptacle.

15 Claims, 5 Drawing Sheets

VEHICULAR ELECTRICAL SYSTEMS

TECHNICAL FIELD

The present invention generally relates to vehicular electrical systems. More specifically, the present invention relates to vehicular electrical systems that are configured to provide power to external loads.

BACKGROUND OF THE INVENTION

In recent years advances in technology, as well as ever-evolving tastes in style, have led to substantial changes in the design of automobiles. One of the changes involves the complexity of the electrical systems within automobiles, particularly alternative fuel (or propulsion) vehicles that utilize voltage supplies, such as hybrid and battery electric vehicles. Such alternative fuel vehicles typically use one or more electric motors, often powered by batteries perhaps in combination with another actuator to drive the wheels.

These advances may provide an opportunity to provide alternative fuel vehicles with the ability to operate as mobile power stations. Fuel cell vehicles may be particularly well-suited to such operation, as fuel cells are capable of providing a steady supply of high power for a relatively long time compared to batteries. However, current vehicular electrical systems are not suited to properly manage power allocation, avoid overloads, and maintain suitable voltage levels.

Accordingly, it is desirable to provide an improved vehicular electrical system that properly manages on-board voltage sources such that the vehicle may be used as a mobile power station. Furthermore, other desirable features and characteristics of the present invention will become apparent from the subsequent detailed description and the appended claims, taken in conjunction with the accompanying drawings and the foregoing technical field and background.

SUMMARY OF THE INVENTION

In one embodiment, a vehicular electrical system is provided. The vehicular electrical system includes a first direct current (DC) voltage supply, a second DC voltage supply coupled to the first DC voltage supply, a first direct current-to-direct current (DC/DC) power converter coupled to the first and second DC voltage supplies, a second DC/DC power converter coupled to first and second DC voltage supplies and the first DC/DC power converter, and a power receptacle electrically connected to the second DC/DC power converter. The second DC/DC power converter is configured to regulate power flow between the first and second voltage supplies and the power receptacle.

In another embodiment, an automotive electrical system is provided. The automotive electrical system includes a first DC voltage supply, a second DC voltage supply coupled to the first DC voltage supply, a first DC/DC power converter coupled to the first and second DC voltage supplies, the first DC/DC power converter being configured to control power flow between the first DC voltage supply and the second DC voltage supply, a node electrically connected between the first DC voltage supply and the first DC/DC power converter, a power receptacle coupled to the second DC/DC power converter electrically connected between the node and the power receptacle, the second DC/DC power converter being configured to control power flow between the first and second DC voltage supplies and the power receptacle.

In a further embodiment, an automotive electrical system is provided. The automotive electrical system includes a DC voltage supply, a second DC voltage supply coupled to the first DC voltage supply, a first DC/DC power converter coupled to the first and second DC voltage supplies, a node electrically connected between the first DC voltage supply and the first DC/DC power converter, a power receptacle coupled to the node, a second DC/DC power converter electrically connected between the node and the power receptacle, and a processing system in operable communication with the first and second DC voltage supplies and the first and second DC/DC power converters. The processing system is configured to operate the second DC/DC power converter to limit power provided to the power receptacle based on an available voltage of the fuel cell and operate the second DC/DC power converter to limit power provided to the power receptacle based on a voltage threshold.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description. Additionally, although the schematic diagrams shown herein depict example arrangements of elements, additional intervening elements, devices, features, or components may be present in an actual embodiment. It should also be understood that FIGS. 1-5 are merely illustrative and may not be drawn to scale.

The following description refers to elements or features being "connected" or "coupled" together. As used herein, "connected" may refer to one element/feature being mechanically joined to (or directly communicating with) another element/feature, and not necessarily directly. Likewise, "coupled" may refer to one element/feature being directly or indirectly joined to (or directly or indirectly communicating with) another element/feature, and not necessarily mechanically. However, it should be understood that although two elements may be described below, in one embodiment, as being "connected," in alternative embodiments similar elements may be "coupled," and vice versa. Thus, although the schematic diagrams shown herein depict example arrangements of elements, additional intervening elements, devices, features, or components may be present in an actual embodiment.

FIG. 1 to FIG. 5 illustrate a vehicular electrical system. The vehicular electrical system includes a first direct current (DC) voltage supply, a second DC voltage supply coupled to the first DC voltage supply, a first direct current-to-direct current (DC/DC) power converter coupled to the first and second DC voltage supplies, a second DC/DC power converter coupled to first and second DC voltage supplies and the first DC/DC power converter, and a power receptacle electrically connected to the second DC/DC power converter. The second DC/DC power converter is configured to regulate power flow between the first and second voltage supplies and the power receptacle. The electrical system may also include a processing system that is configured to operate the second DC/DC power converter to limit power provided to the power receptacle based on an available voltage of the fuel cell and operate the second DC/DC power converter to limit power provided to the power receptacle based on a voltage threshold.

Figure 1:
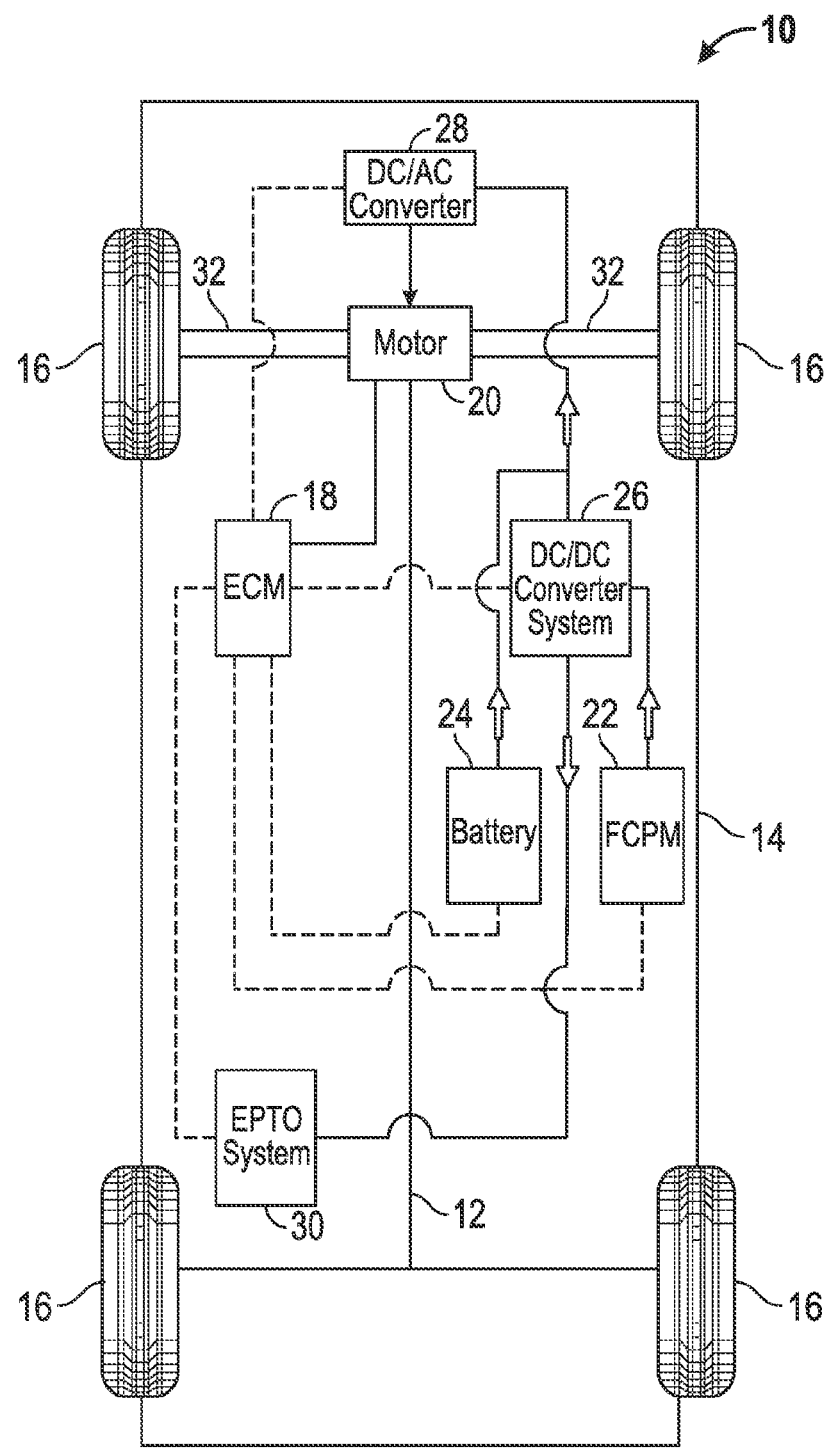
FIG. 1 is a schematic view of an exemplary automobile according to an embodiment.
Figure 1A:
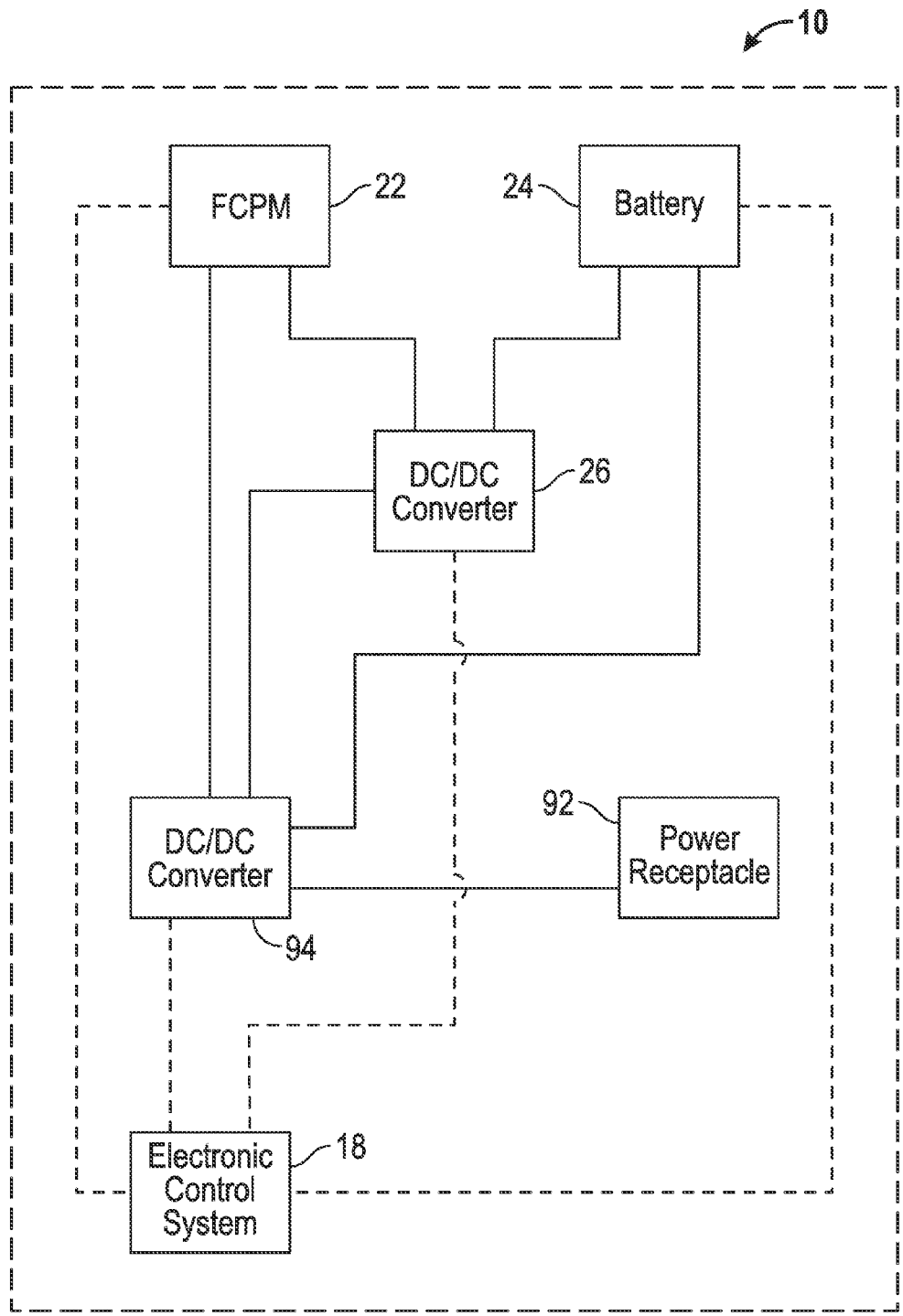
FIG. 1A is a schematic block diagram of an exemplary electrical system within the automobile of FIG. 1.

FIG. 1 is a schematic view a vehicle (or "automobile") 10, according to an embodiment. The automobile 10 includes a chassis 12, a body 14, four wheels 16, and an electronic control system 18. The body 14 is arranged on the chassis 12 and substantially encloses the other components of the automobile 10. The body 14 and the chassis 12 may jointly form a frame. The wheels 16 are each rotationally coupled to the chassis 12 near a respective corner of the body 14.

The automobile 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD), or all-wheel drive (AWD). The automobile 10 may also incorporate any one of, or combination of, a number of different types of engines, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine (i.e., such as in a hybrid electric vehicle (HEV)), and an electric motor.

In the exemplary embodiment illustrated in FIG. 1, the automobile 10 is a fuel cell vehicle and further includes an electric motor/generator 20, a fuel cell power module (FCPM) 22, a battery 24, a DC/DC converter system (or DC/DC converter) 26, a direct current-to-alternative current (DC/AC) power inverter 28, and an electric power take out (EPTO) system 30.

Still referring to FIG. 1, the electric motor 20 is mechanically coupled to at least some of the wheels 16 through one or more drive shafts 32. The battery 24 is a high voltage battery, such as a lithium ion battery.

Although not illustrated, the FCPM 22, in one embodiment, includes, amongst other components, a fuel cell, or high voltage stack, having an anode, a cathode, an electrolyte, and a catalyst. As is commonly understood, the anode, or negative electrode, conducts electrons that are freed from, for example, hydrogen molecules so that they can be used in an external circuit. The cathode, or positive electrode (i.e., the positive post of the fuel cell), conducts the electrons back from the external circuit to the catalyst, where they can recombine with the hydrogen ions and oxygen to form water. The electrolyte, or proton exchange membrane, conducts only positively charged ions while blocking electrons. The catalyst facilitates the reaction of oxygen and hydrogen. As described below, the FCPM 22, in one embodiment, also includes a compressor to regulate the amount of hydrogen in the high voltage stack and an inverter to provide power to the compressor.

Figure 2:
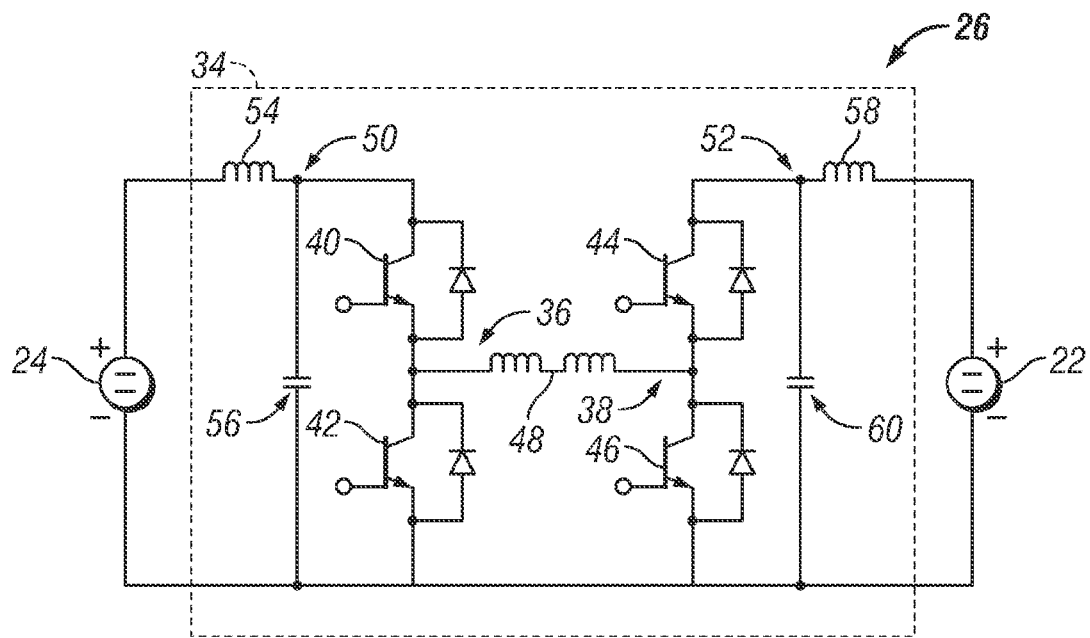
FIG. 2 is a schematic view of a direct current-to-direct current (DC/DC) power converter within the automobile of FIG. 1, according to an embodiment.

FIG. 2 schematically illustrates the DC/DC converter system 26 in greater detail, in accordance with an exemplary embodiment of the present invention. In the depicted embodiment, the DC/DC converter system 26 includes a bi-directional DC/DC converter (BDC) 34 coupled to the FCPM 22 and the battery 24. The BDC converter 34, in the depicted embodiment, includes a power switching section with two dual insulated gate bipolar transistor (IGBT) legs 36 and 38, each having two insulated gate bipolar transistors (IGBTs) 40 and 42, and 44 and 46, respectively. The two legs 36 and 38 are interconnected at midpoints by a switching inductor (or switching inductors) 48. The BDC converter 34 also includes a first filter 50 connected to the positive rail of the first IGBT leg 36 and a second filter 52 connected to the positive rail of the second IGBT leg 38. As shown, the filters 50 and 52 include a first inductor 54, a first capacitor 56, a second inductor 58, and a second capacitor 60, respectively. The first IGBT leg 36 is connected to the FCPM 22 through the first filter 50, and the second IGBT leg 38 is connected to the FCPM 22 through the second filter 52. As shown, the FCPM 22 and the battery are not galvanically isolated, as the negative (−) terminals are electrically connected.

Although not shown, the DC/DC converter system 26 may also include a BDC controller in operable communication with the BDC converter 34. The BDC controller may be implemented within the electronic control system 18 (FIG. 1), as is commonly understood in the art.

Figure 3:
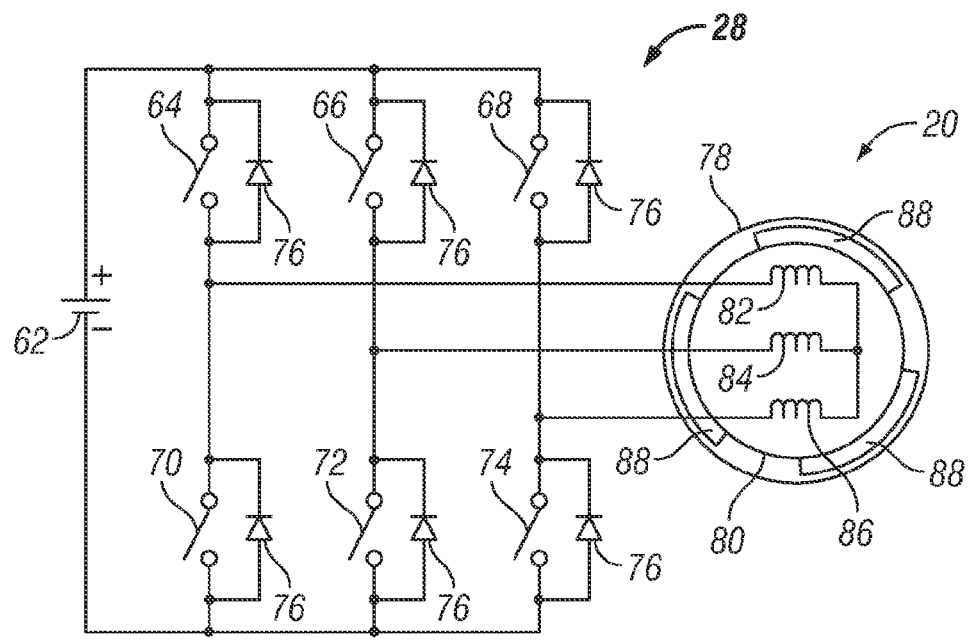
FIG. 3 is a schematic view of a power inverter and an electric motor within the automobile of FIG. 1, according to an embodiment.

FIG. 3 schematically illustrates the inverter 28 and the motor 20 in greater detail. In the depicted embodiment, the inverter 28 includes a three-phase circuit coupled to the motor 20. More specifically, the inverter 28 includes a switch network having a first input coupled to a voltage source 62 (e.g., the DC/DC converter system 26) and an output coupled to the motor 20. Although a single voltage source is shown, a distributed DC link with two or more series sources may be used.

The switch network comprises three pairs of series power switching devices (or switches or components) with antiparallel diodes (i.e., antiparallel to each switch) corresponding to each of the phases of the motor 20. Each of the pairs of series switches comprises a first switch, or transistor, (i.e., a "high" switch) 64, 66, and 68 having a first terminal coupled to a positive electrode of the voltage source 62 and a second switch (i.e., a "low" switch) 70, 72, and 74 having a second terminal coupled to a negative electrode of the voltage source 62 and a first terminal coupled to a second terminal of the respective first switch 64, 66, and 68.

As is commonly understood, each of the switches 64-74 may be in the form of individual semiconductor devices such as insulated gate bipolar transistors (IGBTs) within integrated circuits formed on semiconductor (e.g., silicon) substrates (e.g., die). As shown, a diode 76 is connected in an antiparallel configuration (i.e., a "flyback" or "freewheeling" diode) to each of the switches 64-74. As such, each of the switches 64-74 and the respective diode 76 may be understood to form a switch-diode pair or set, six of which are included in the embodiment shown. Although not shown, the inverter 28 may also include current sensors (e.g., Hall Effect sensors) to detect the flow of current through the switches 64-74 (and/or windings 82, 84, and 86).

As will be appreciated by one skilled in the art, the electric motor 20, in one embodiment, is a three-phase, permanent magnet electric motor and includes a stator assembly 78 and a rotor assembly 80, as well as a transmission and a cooling fluid (not shown). The stator assembly 78 includes a plurality (e.g., three) conductive coils or windings 82, 84, and 86, each of which is associated with one of the three phases of operation of the electric motor 20, as is commonly understood. The rotor assembly 80 includes a plurality of magnets 88 and is rotatably coupled to the stator assembly 78. The magnets 88 may include multiple (e.g., sixteen) electromagnetic poles, as is commonly understood. It should be understood that the description provided above is intended only as an example of one type of electric motor that may be used.

Figure 4:
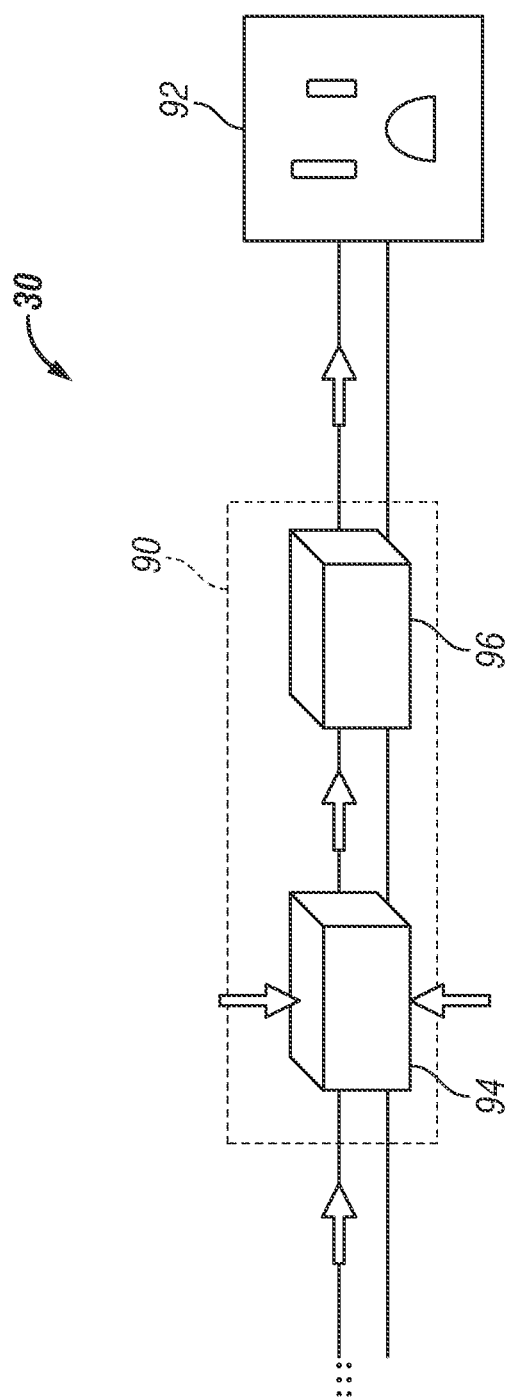
FIG. 4 is a block diagram of an electric power take out (EPTO) system within the automobile of FIG. 1, according to an embodiment.

FIG. 4 illustrates the EPTO system 30 in greater detail. The EPTO system 30 includes an EPTO module 90 and a power receptacle 92. The EPTO module 90 includes an EPTO (or a second) DC/DC power converter 94 and an EPTO (or a second) DC/AC power inverter 96, which may be similar to the DC/DC power converter 26 and the DC/AC power inverter 28 described above. The power receptacle 92 is electrically connected to the EPTO inverter 96 and may be in the form of a common, household power receptacle (e.g., NEMA 5-15) that is mounted to the body of the automobile 10 (FIG. 1).

Referring again to FIG. 1, the electronic control system 18 is in operable communication with the electric motor 20, the FCPM 22, the battery 24, the DC/DC converter 26, the inverter 28, and the EPTO system 30. Although not shown in detail, the electronic control system 18 includes various sensors and automotive control modules, or electronic control units (ECUs), such a power electronic (e.g., inverter and converter) control module, a motor controller, and a vehicle controller, and at least one processor (or processing system) and/or a memory having instructions stored thereon (or in another computer-readable medium) for carrying out the processes and methods as described below.

Figure 5:
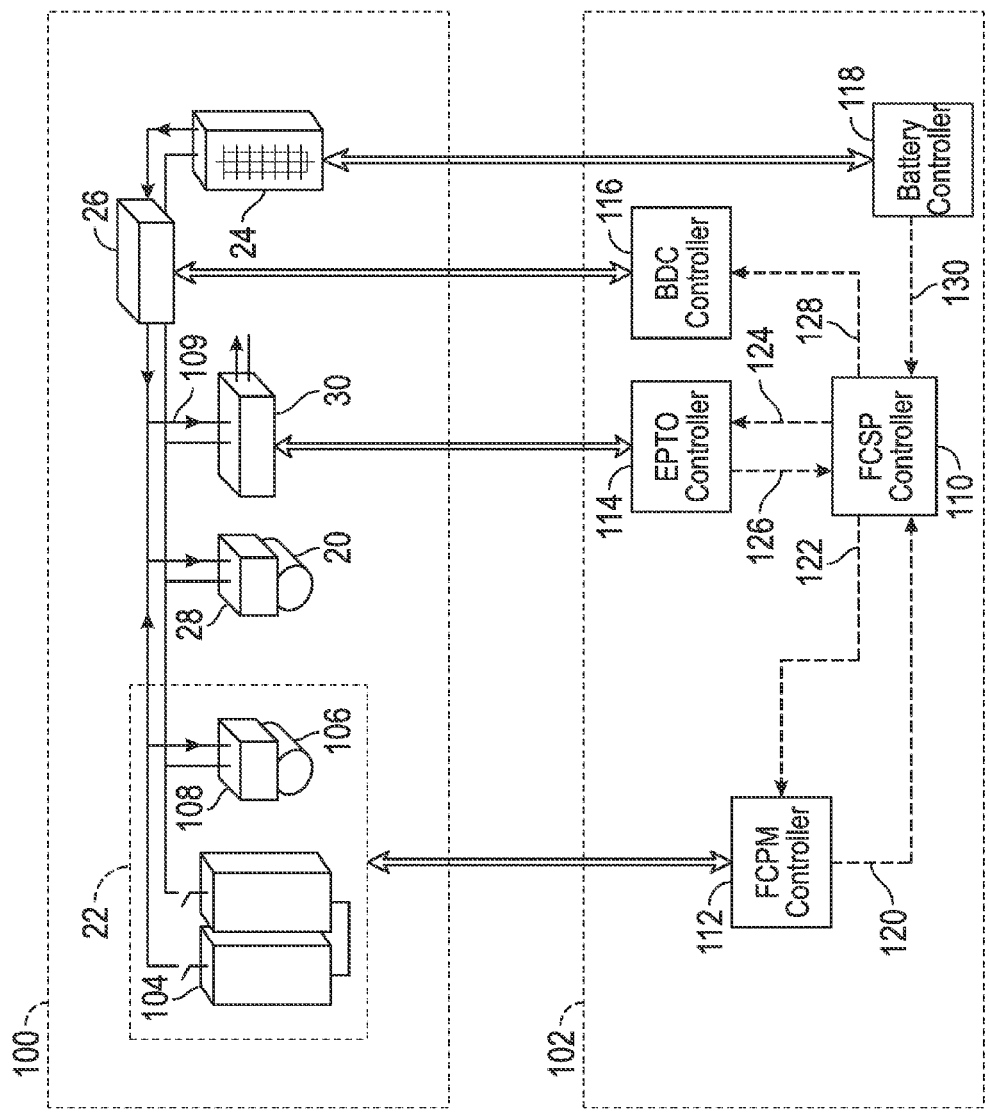
FIG. 5 is schematic block diagram of an electrical system within the automobile of FIG. 1 and a control system (and/or method) for controlling the system, according to an embodiment.

FIG. 5 illustrates a portion of an electrical system 100 within the automobile 10 and control system (and/or method) 102 for the electrical system 100 (and/or the EPTO system 30). The electrical system 100 includes the FCPM 22, the battery 24, the DC/DC power converter 26, the DC/AC power inverter 28, the electric motor 20, and the EPTO system 30. As described above, and shown in FIG. 5, the FCPM includes a high voltage stack 104, a compressor 106 (which includes an electric motor and in fluid communication with a hydrogen supply), and a FCPM inverter 108. In the depicted embodiment, the EPTO system 30 is electrically connected to an EPTO node 109 that is electrically connected between the DC/DC converter 26 and the FCPM 22. That is, the EPTO system 30 is connected to the "fuel cell side" of the DC/DC converter 26.

The control system 102 includes a fuel cell power system (FCPS) controller 110, a FCPM controller 112, an EPTO controller 114, a BDC controller 116, and a battery controller 118. The control system 102 may be implemented within the electronic control system 18 (FIG. 1) as various software "blocks," as is commonly understood. As indicated in FIG. 5, the FCPM controller 112, the EPTO controller 114, the BDC controller 116, and the battery controller 118 are in operable communication with the FCPM 22, the EPTO 30, the DC/DC converter 26, and the battery 24, respectively.

Referring to FIG. 1, during normal operation (i.e., driving), the automobile 10 is operated by providing power to the wheels 16 with the electric motor 20 using the FCPM and the battery in an alternating manner and/or using the FCPM and the battery simultaneously. In order to power the electric motor 20, DC power is provided from the FCPM 22 and/or the battery 24 by the DC/DC converter 26 to the inverter 28, which converts the DC power into AC power, before the power is sent to the electric motor 20. As will be appreciated by one skilled in the art, the conversion of DC power to AC power is substantially performed by operating (i.e., repeatedly switching) the transistors within the inverter 28 at an operating (or switching) frequency, such as, for example, 12 kilohertz (kHz). The inverter controller within the electronic control system 18 performs multiple operations during normal, or forward, operation including, but not limited to, receiving a torque command, converting the torque command to current commands based on present speed and available voltage, and performing regulation on such current commands.

As will be appreciated by one skilled in the art, the operation of the switches 64-74 (FIG. 3) causes current to flow through the windings 82, 84, and 86 in the motor 20. The interaction of this current with the magnetic fields generated by the magnets 88 causes a Lorentz force to be generated, thus causing the rotor assembly 80 to rotate relative to the stator assembly 78.

In accordance with one aspect of the present invention, the automobile 10 may be used as a portable power station, as the EPTO system 30 provides a means to use both the FCPM 22 and the battery 24 as power sources for external electronic devices, such as televisions, lights, air compressors, and audio equipment, by plugging the devices into the power receptacle 92 (FIG. 4). In one embodiment, power is only provided to the power receptacle when the automobile 10 is not in an operational state (e.g., the gear selector is in PARK). Generally, the EPTO DC/DC power converter 94 (FIG. 4) manages the flow of power between the electrical system 100 shown in FIG. 5 (i.e., the FCPM 22 and the battery 24), while the EPTO inverter 96 converts the DC power from the electrical system 100 to AC power for use by the external load(s).

The FCPM 22 generates electrical power from hydrogen on the anode side and oxygen on the cathode side. The maximum amount of power, which can be delivered from the FCPM 22, is dependent on the supply of hydrogen and oxygen. In order to increase the supply of oxygen and hydrogen, the compressor 106 is activated. However, if the gas supply is suitable for the high voltage stack 104 to deliver high loads and only a small amount of power is drawn, the membrane in the high voltage stock 104 may be damaged (e.g., because of humidity). Thus, it is desirable to maintain the gas supply to match the drawn electrical current in steady state conditions such that the power requested of the FCPM 22 is the same as the actual power (i.e., the maximum power available from the FCPM 22). With respect to FIG. 5, the maximum power output of the FCPM 22 is sent from the FCPM 22 to the FCPS controller 110 in the form of signal 120, and a power request is sent from the FCPS controller 110 to the FCPM 22 in the form of signal 122.

In one embodiment, the total power used by electrical loads connected to the EPTO system 30 varies between 0 and 25 kilowatts (kW). The power the EPTO system 30 transfers from FCPM 22 to external loads follows a power command sent by the FCPS controller 110 in the form of signal 124.

The actual EPTO input power (i.e., P=VI), along with the current consumption of the other electronic components in the system, is determined by the FCPS controller 110 based on signal 126 from the EPTO controller 114. The FCPS controller 110 calculates how much of the power demanded is to be delivered by the FCPM 22, on which the power request (signal 122) is based. The FCPS controller 110 also calculates how much of the demanded power is to be delivered by the battery 24 and similarly sends a power request to the BDC controller 116 in the form of signal 128. The FCPS controller 110 also uses the maximum available discharge power from the battery 24, which it receives in the form of signal 130 from the battery controller 118.

A sudden increase of the system power demand is generally is met by the battery 24 because the FCPM 22 may require more time to provide the necessary gas supply (e.g., air compressor dynamic) than the DC/DC converter 26 requires to transfer battery power. However, generally steady state power is provided by the FCPM 22, at least in part because the battery's 24 capacity is limited.

According to one aspect of the present invention, the FCPS controller 110 generates a "lower input voltage limit" and an "upper output voltage limit" for the EPTO system 30. The lower input voltage limit is associated with an "undervoltage" condition for the high voltage stack 104, which specifically refers to a situation in which an attempt is being made to draw more power from the FCPM 22 than is possible at that particular time due to the gas supply. The upper output voltage limit is associated with an "overvoltage" condition for the external load(s) connected to the EPTO system 30.

If the lower input voltage limit (or threshold) is reached (e.g., because of an EPTO input power drop caused by a BDC error), the EPTO controller 114 reduces the actual transmitted power, overriding the power command to keep the input voltage of the EPTO system 30 above the actual voltage available in the FCPM 22. As such, undervoltage conditions for the high voltage stack 104 and FCPM 22 components is avoided, which could potentially damage the high voltage stack 104.

If the upper output voltage limit is reached, the EPTO controller 114 reduces the transmitted power to keep the output voltage below the limit. One possible cause of the upper limit being reached is a sudden drop of power drawn by the external loads (e.g., one of two external load devices is shut down). The reduction in transmitted power avoids any overvoltage condition, and possible damage, for the external loads. In one embodiment, the upper output voltage limit is set to the appropriate regional standard for household power outlets (e.g., in North America, the limit is set to 120 V).

The upper output voltage limit may also be used to provide a fixed voltage level at the EPTO output. This may be achieved by setting the upper output voltage limit to the desired output voltage, commanding slightly higher power of the EPTO system 30 than actually is drawn, and making usage of the internal EPTO voltage control.

Such a strategy allows the EPTO system 30 to operate at the upper voltage limit (e.g., fixed at 120 V). It also allows external loads to ramp up the drawn power because slightly higher power than is drawn by the load is commanded to the EPTO. The increase in drawn power is detected by FCPS controller 110. The FCPS controller 110 immediately increases the power command to the BDC or increase the power request to the FCPM 22. This allows a controlled power ramp up of the system.

The system described above may be implemented in systems other than automobiles, such as watercraft and aircraft. The electric motor and the power inverter may have different numbers of phases, such as two or four. Other forms of power sources may be used, such as current sources and loads including diode rectifiers, thyristor converters, fuel cells, inductors, capacitors, and/or any combination thereof. It should be noted that the numerical ranges provided above are intended to serve only as examples and not intended to limit the use of the system described above.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A vehicular electrical system comprising:
    a first direct current (DC) voltage supply including a fuel cell;
    a second DC voltage supply including a battery coupled to the first DC voltage supply;
    a first direct current-to-direct current (DC/DC) power converter coupled to the first and second DC voltage supplies;
    a second DC/DC power converter coupled to first and second DC voltage supplies and the first DC/DC power converter; and
    a power receptacle electrically connected to the second DC/DC power converter,
    a processing system in operable communication with the first and second DC voltage supplies, the first and second DC/DC power converters and the processing system:
        operates the second DC/DC power converter to limit power provided to the power receptacle based on an available voltage of the fuel cell and the battery; and
        operates the second DC/DC power converter to limit power provided to the power receptacle based on a voltage threshold,
    wherein the second DC/DC power converter regulates power flow between the first and second voltage supplies and the power receptacle such that both the first and second voltage supplies supply power to an external load coupled to the power receptacle.

2. The vehicular electrical system of claim 1, further comprising at least one load device coupled to the first and second DC voltage supplies and the first DC/DC power converter, and wherein the first DC/DC power converter is configured to regulate power flow between the first voltage supply and the second voltage supply.

3. The vehicular electrical system of claim 2, further comprising at least one direct current-to-alternating current (DC/AC) power inverter coupled to the first and second DC voltage supplies and the first and second DC/DC power converters.

4. The vehicular electrical system of claim 3, wherein the second DC/DC power converter is electrically connected to a node that is electrically connected between the first DC voltage supply and the first DC/DC power converter.

5. The vehicular electrical system of claim 4, wherein each of the first DC/DC power converter, the second DC/DC power converter, and the at least one DC/AC power inverter comprises a plurality of power switching devices.

6. The vehicular electrical system of claim 5, wherein the at least one load device is an automotive propulsion traction motor.

7. The vehicular electrical system of claim 1, wherein the at least one DC/AC power inverter comprises a DC/AC power inverter electrically connected between the second DC/DC power converter and the power receptacle.

8. The vehicular electrical system of claim 2, wherein the at least one load device comprises a compressor coupled to the fuel cell.

9. An automotive electrical system comprising:
    a first direct current (DC) voltage supply including a fuel cell;
    a second DC voltage supply including a battery coupled to the first DC voltage supply;

a first direct current-to-direct current (DC/DC) power converter coupled to the first and second DC voltage supplies, the first DC/DC power converter being configured to control power flow between the first DC voltage supply and the second DC voltage supply;

a node electrically connected between the first DC voltage supply and the first DC/DC power converter;

a power receptacle coupled to the node; and a second DC/DC power converter electrically connected between the node and the power receptacle, and the second DC/DC power converter regulates power flow between the first and second DC voltage supplies and the power receptacle such that both the first and second DC voltage supplies supply power to an external load coupled to the power receptacle;

a processing system in operable communication with the first and second DC voltage supplies, the first and second DC/DC power converters and the processing system:

operates the second DC/DC power converter to limit power provided to the power receptacle based on an available voltage of the fuel cell and the battery; and operates the second DC/DC power converter to limit power provided to the power receptacle based on a voltage threshold.

10. The automotive electrical system of claim 9, further comprising a compressor coupled to the fuel cell.

11. The automotive electrical system of claim 10, further comprising a direct current-to-alternating current (DC/AC) power inverter electrically connected between the second DC/DC power converter and the power receptacle.

12. An automotive electrical system comprising:

a first direct current (DC) voltage supply including a fuel cell;

a second DC voltage supply including a battery coupled to the first DC voltage supply;

a first direct current-to-direct current (DC/DC) power converter coupled to the first and second DC voltage supplies;

a node electrically connected between the first DC voltage supply and the first DC/DC power converter;

a power receptacle coupled to the node;

a second DC/DC power converter electrically connected between the node and the power receptacle that regulates power flow between the first and second DC voltage supplies and the power receptacle such that both the first and second DC voltage supplies supply power to an external load coupled to the power receptacle; and a processing system in operable communication with the first and second DC voltage supplies and the first and second DC/DC power converters, and the processing system:

operates the second DC/DC power converter to limit power provided to the power receptacle based on an available voltage of the fuel cell; and operates the second DC/DC power converter to limit power provided to the power receptacle based on a voltage threshold.

13. The automotive electrical system of claim 12, further comprising at least one load device coupled to the first and second DC voltage supplies and the first DC/DC power converter.

14. The automotive electrical system of claim 13, further comprising at least one direct current-to-alternating current (DC/AC) power inverter coupled to the first and second DC voltage supplies and the first and second DC/DC power converters.

15. The automotive electrical system of claim 14, wherein the at least one DC/AC power inverter comprises a DC/AC power inverter electrically connected between the second DC/DC power converter and the power receptacle.

* * * * *